US007093543B2

(12) United States Patent
Nakamura et al.

(10) Patent No.: US 7,093,543 B2
(45) Date of Patent: Aug. 22, 2006

(54) CARRIAGE TYPE CONVEYOR

(75) Inventors: Takushi Nakamura, Osaka (JP); Masahiro Ooe, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/912,372

(22) Filed: Aug. 5, 2004

(65) Prior Publication Data
US 2005/0051047 A1 Mar. 10, 2005

(30) Foreign Application Priority Data
Sep. 8, 2003 (JP) ............................. 2003-314915

(51) Int. Cl.
B61B 3/00 (2006.01)
(52) U.S. Cl. ..................................... 104/96
(58) Field of Classification Search ................. 104/96, 104/106, 107, 165, 166, 170
See application file for complete search history.

(56) References Cited

U.S. PATENT DOCUMENTS

| 3,848,535 | A | * | 11/1974 | Mitchell | ...................... 104/124 |
| 4,838,171 | A | * | 6/1989 | Yokoi et al. | ................. 104/166 |
| 5,839,567 | A | * | 11/1998 | Kyotani et al. | ............. 198/683 |
| 6,494,142 | B1 | * | 12/2002 | Masugaki et al. | .......... 104/168 |

FOREIGN PATENT DOCUMENTS

JP 2003-048006 2/2001

* cited by examiner

Primary Examiner—S. Joseph Morano
Assistant Examiner—Robert J. McCarry, Jr.
(74) Attorney, Agent, or Firm—Schweitzer Cornman Gross & Bondell LLP

(57) ABSTRACT

A friction-drive carriage type conveyor includes a carriage 1 for running in a running direction along a horizontal track including a first track section and a second track section, which crosses a passage 26. Friction drivers 29 and 30 are fitted on both sides of the passage 26 to drive the carriage 1 across it. A main guide rail 14 lies along the whole length of the first track section. A rear auxiliary guide rail 31 lies along the first track section and is upstream of the passage 26. A front auxiliary guide rail 32 lies along the first track section and is downward of the passage 26. The carriage 1 is fitted with a pair of main guided members 4 and 5 for engaging with the main guide rail 14, a pair of front auxiliary guided members 6 and 7 for engaging with the front auxiliary guide rail 32, and a pair of rear auxiliary guided members 8 and 9 for engaging with the rear auxiliary guide rail 31. The main guided members 4 and 5 are spaced from each other in the running direction. The front auxiliary guided members 6 and 7 are forward of the main guided members 4 and 5 and spaced from each other in the running direction. The rear auxiliary guided members 8 and 9 are backward of the main guided members 4 and 5 and spaced from each other in the running direction. The auxiliary guided members 6–9 are positioned on either side of the main guide rail 14. While the carriage 1 is passing across the passage 26, at least two of the guided members 4–9 engage with the associated guide rail or rails 14, 31 and/or 32 on one or both sides of this passage. This ensures that the carriage 1 passes linearly across the passage 26.

4 Claims, 9 Drawing Sheets

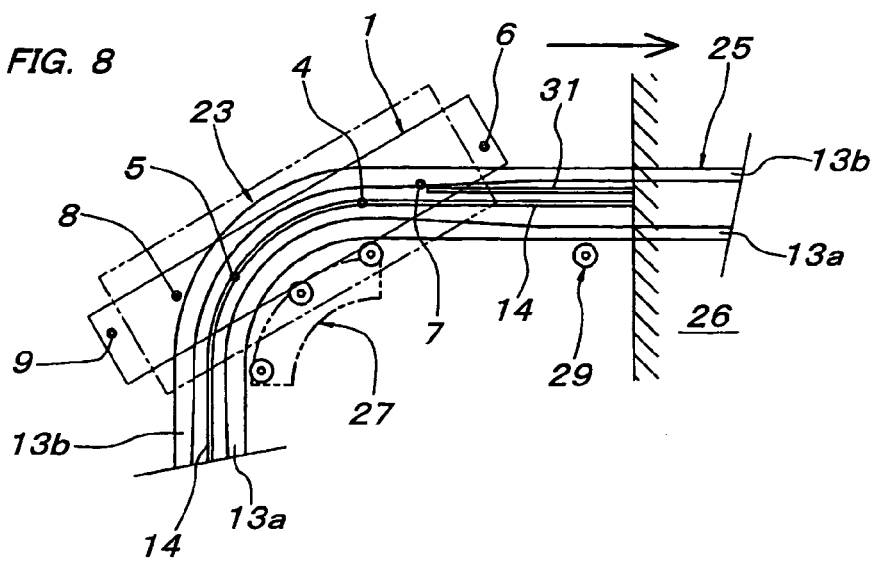
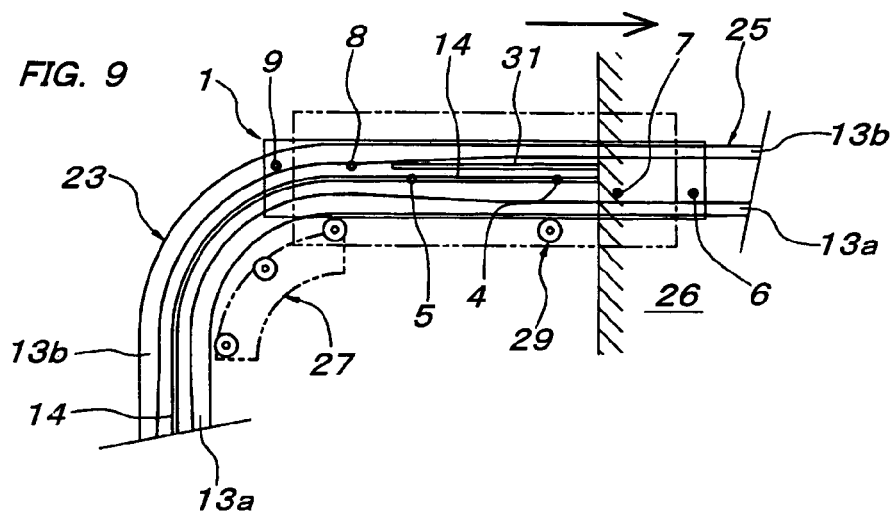
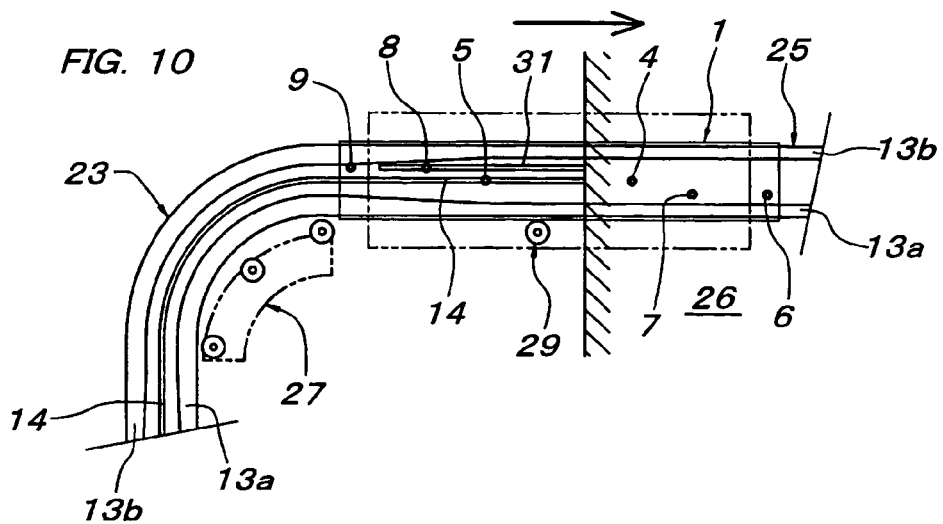

CARRIAGE TYPE CONVEYOR

FIELD OF THE INVENTION

The present invention relates to a friction-drive carriage type conveyor with a relatively long integral carriage, which has no horizontal joint over its whole length.

PRIOR ART

For example, Japanese Unexamined Patent Publication No. 2001-48006 discloses a friction-drive carriage type conveyor including a carriage for running along a horizontal track. The carriage is fitted with casters for rolling on the track. A guide rail lies along the track. The carriage is also fitted with a pair of guided members for engaging with the guide rail. The guided members are positioned near the center of the carriage and spaced from each other in the running direction in which the carriage runs. The carriage has a frictional surface extending in the running direction. A friction driver can contact with the frictional surface to drive the carriage along the track.

In such a friction-drive carriage type conveyor, if the horizontal track crosses a passage, the guide rail may not be able to lie across the passage, because the rail might prevent people and cars from passing safely along the passage. In this case, two friction drivers may conceivably be provided along the track on both sides of the passage. The carriage can traverse the passage by being driven into it by the friction driver upstream of it and subsequently driven out of it by the friction driver downstream of it. However, the conveyor has no means for ensuring that the upstream friction driver moves the carriage linearly into the passage. This may prevent the carriage from passing so linearly across the passage as to be reliably taken over by the downstream friction driver.

SUMMARY OF THE INVENTION

The object of the present invention is to provide a friction-drive carriage type conveyor that solves the foregoing problem.

A friction-drive carriage type conveyor according to the present invention includes a carriage so supported as to run in a running direction along a track including a first track section and a second track section, which crosses a passage. The carriage is fitted with a caster for rolling on the track and supporting the carriage. The carriage has a frictional surface extending in the running direction. The conveyor also includes a friction driver for contacting with the frictional surface to drive the carriage along the track. The conveyor further includes a main guide rail, a front auxiliary guide rail and a rear auxiliary guide rail. The main guide rail lies along the whole length of the first track section. The front auxiliary guide rail lies along the first track section and is downstream of the passage. The rear auxiliary guide rail lies along the first track section and is upstream of the passage. The carriage is also fitted with a pair of main guided members for engaging with the main guide rail, a pair of front auxiliary guided members for engaging with the front auxiliary guide rail, and a pair of rear auxiliary guided members for engaging with the rear auxiliary guide rail. The main guided members are positioned near the center of the carriage and spaced from each other in the running direction by a distance shorter than the width of the passage. The front auxiliary guided members are forward of the main guided members and spaced from each other in the running direction. The rear auxiliary guided members are backward of the main guided members and spaced from each other in the running direction. The front and rear auxiliary guided members are positioned on either side of the main guide rail. While the carriage is passing across the passage, at least two of the main and auxiliary guided members engage with the associated guide rail or rails on at least one side of the passage.

Thus, while the carriage is passing across the passage, at least two of the six guided members, which are the main guided members, front auxiliary guided members and rear auxiliary guided members, engage with at least one of the three guide rails, which are the main guide rail, front auxiliary guide rail and rear auxiliary guide rail, on at least one side of the passage. Accordingly, while the carriage is passing across the passage, one or more of the guide rails guide the carriage always at two points spaced from each other in the running direction. This makes it possible to move the carriage very linearly across the passage, where there is no guide rail for guiding the carriage. Consequently, the carriage is prevented from stopping at the passage in case it could not engage with the main guide rail on the downstream side of the passage.

This conveyor is simpler and less costly in comparison with a case where large carriage guides might be used additionally on both sides of the passage to hold the carriage on both sides of the carriage so that the carriage could pass only linearly across the passage. There may be a case where the first track section includes a turning path either just upstream or just downstream of the passage. Particularly in this case, it would be necessary that the carriage guides could be opened and closed so as not to interfere with the ends of the carriage, which shift outward of the turning path while the carriage is running along this path. This would greatly raise the cost of equipment and need switching control of the carriage guides, making it difficult to implement the conveyor. The present invention makes it possible to achieve its object by implementing the conveyor simply and easily without the foregoing inconveniences.

Basically, the front and rear auxiliary guided members may be positioned on one side of the main guide rail. In this case, the front auxiliary guided members may be either in or out of alignment with the rear auxiliary guided members. Alternatively, the front and rear auxiliary guided members may be positioned on opposite sides of the main guide rail.

The first track section may include at least one turning path. While the carriage is running along the turning path, both ends of the carriage shift temporarily to the outer side of this path, which is away from the center of curvature of the path, and subsequently return to their original positions. In this case, it is preferable that at least whichever of the pair of front auxiliary guided members and the pair of rear auxiliary guided members is positioned inside the turning path with respect to the main guide rail, i.e., on that side of this rail to which the turning path forward of the carriage in the running direction curves is positioned higher than the rail. The higher guided members avoid colliding with the main guide rail when they shift laterally with respect to the running direction while the carriage is running along the turning path. This makes it possible to also apply the present invention to a track layout including a turning path.

The turning path may be either just downstream or just upstream of the passage. In this case, while the carriage is running along the turning path, the higher auxiliary guided members, which are positioned inside this path, avoid colliding with the main guide rail. Depending on the direction in which the turning path curves, however, when both ends of the carriage shift laterally while it is running along this path, the front auxiliary guided members may collide with the rear auxiliary guide rail, which is upstream of the passage, or the rear auxiliary guided members may collide with the front auxiliary guide rail, which is downstream of the passage. Accordingly, in addition to the arrangement where the auxiliary guided members at least inside the turning path with respect to the main guide rail are positioned higher than this rail, the pair of front auxiliary guided members may differ in height from the pair of rear auxiliary guided members. Whichever of the pair of front auxiliary guided members and the pair of rear auxiliary guided members is higher may be positioned higher than the auxiliary guide rail for engaging with the lower pair of auxiliary guided members. This prevents the front auxiliary guided members from colliding laterally with the rear auxiliary guide rail, which is upstream of the passage, or the rear auxiliary guided members from colliding with the front auxiliary guide rail, which is downstream of the passage.

Each of the main and auxiliary guide rails may consist of a pair of vertical plates. Each of the main and auxiliary guided members may be a vertical pin supported rotatably on a vertical axis for engaging with the inner sides of the vertical plates. The vertical plates and pins are simple in structure and cheap.

BRIEF DESCRIPTION OF THE DRAWINGS

A preferred embodiment of the present invention is shown in the accompanying drawings, in which:

FIGS. 8–10 are partial top plans of the track, showing how the carriage runs on the upstream side of the passage;

DETAILED DESCRIPTION OF THE PREFERRED EMBODIMENT

Figure 1:
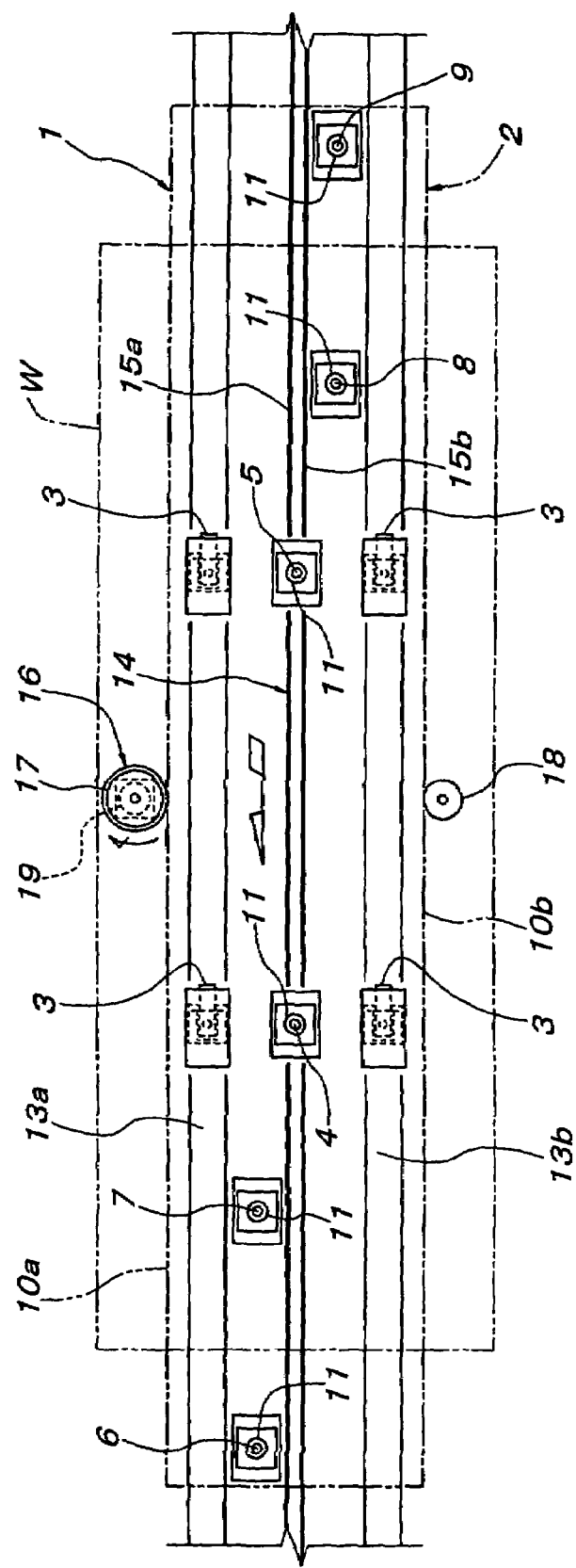
FIG. 1 is a partial top plan of a friction-drive carriage type conveyor embodying the present invention.
Figure 2:
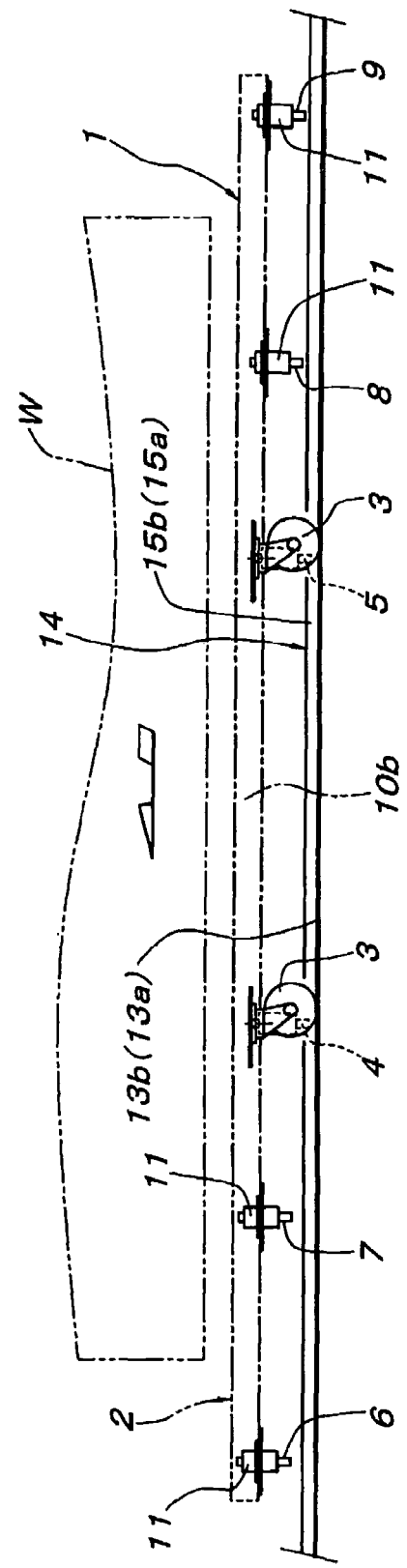
FIG. 2 is a partial side view of the conveyor.

With reference to FIGS. 1–5, a friction-drive carriage type conveyor embodying the present invention includes a carriage 1, which runs in a running direction along a horizontal closed-loop track on a floor. The carriage 1 includes a long integral deck 2 for supporting a car body or another work W. The deck 2 has no horizontal joint between both its ends.

The deck 2 has a pair of frictional surfaces 10a and 10b formed on its right and left sides, respectively, in the running direction. The frictional surfaces 10a and 10b are the right and left side surfaces of the deck 2 itself. Alternatively, the frictional surfaces 10a and 10b might be side surfaces of one or more longitudinal members fixed to the deck 2.

The bottom of the deck 2 is fitted with a pair of front casters 3 and a pair of rear casters 3. The casters 3 are positioned on both sides of the center line of the deck 2.

The bottom of the deck 2 is also fitted with a front main guided member 4, a rear main guided member 5, a pair of front auxiliary guided members 6 and 7, and a pair of rear auxiliary guided members 8 and 9. The main guided members 4 and 5 are positioned on the center line of the deck 2 midway between both ends of the deck. The front auxiliary guided members 6 and 7 are forward of the main guided members 4 and 5 and positioned on the right side of the center line, but might be positioned on the left side. The front auxiliary guided member 6 is forward of the front auxiliary guided member 7. The rear auxiliary guided members 8 and 9 are backward of the main guided members 4 and 5 and positioned on the left side of the center line. The rear auxiliary guided member 8 is forward of the rear auxiliary guided member 9. The distance between the rear auxiliary guided members 8 and 9 is equal to that between the front auxiliary guided members 6 and 7.

Each of the main and auxiliary guided members 4–9 is a vertical pin, which is supported rotatably on a vertical axis by a vertical supporting cylinder 11 fixed to the deck 2. The vertical pin extends vertically through the supporting cylinder 11. The bottom of the pin protrudes from the cylinder 11. The guided members 4–9 might have another structure.

A pair of parallel belt plates 13a and 13b extends along the horizontal track and are supported by a number of cross frames 12, which rest on the floor. Alternatively, the belt plates 13a and 13b might lie directly on the floor. The casters 3 roll on the belt plates 13a and 13b, but could roll directly on the floor.

Figure 3:
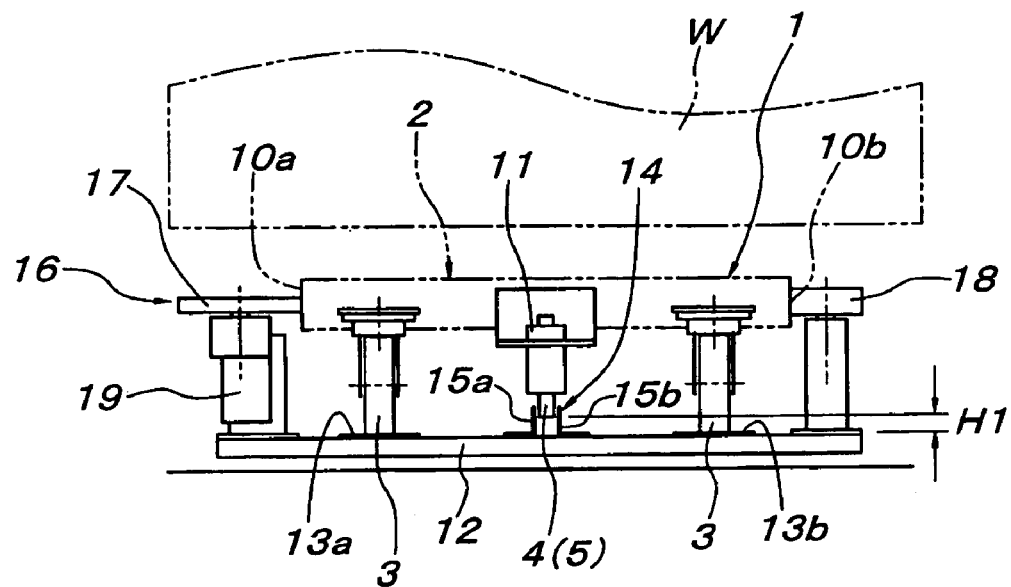
FIG. 3 is front views of a carriage and a friction driver of the conveyor at a main guided member of the carriage.
Figure 4:
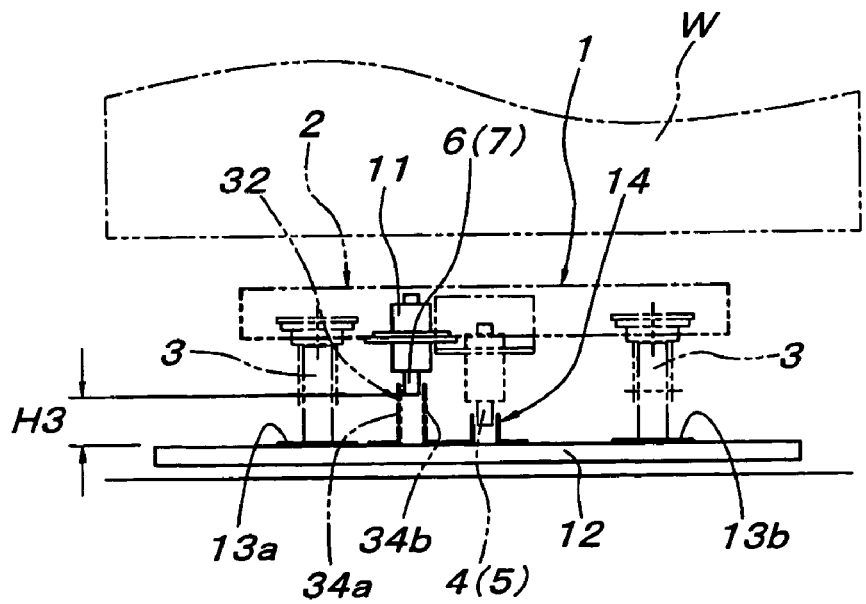
FIG. 4 is a front view of the carriage at a front auxiliary guided member of the carriage.
Figure 5:
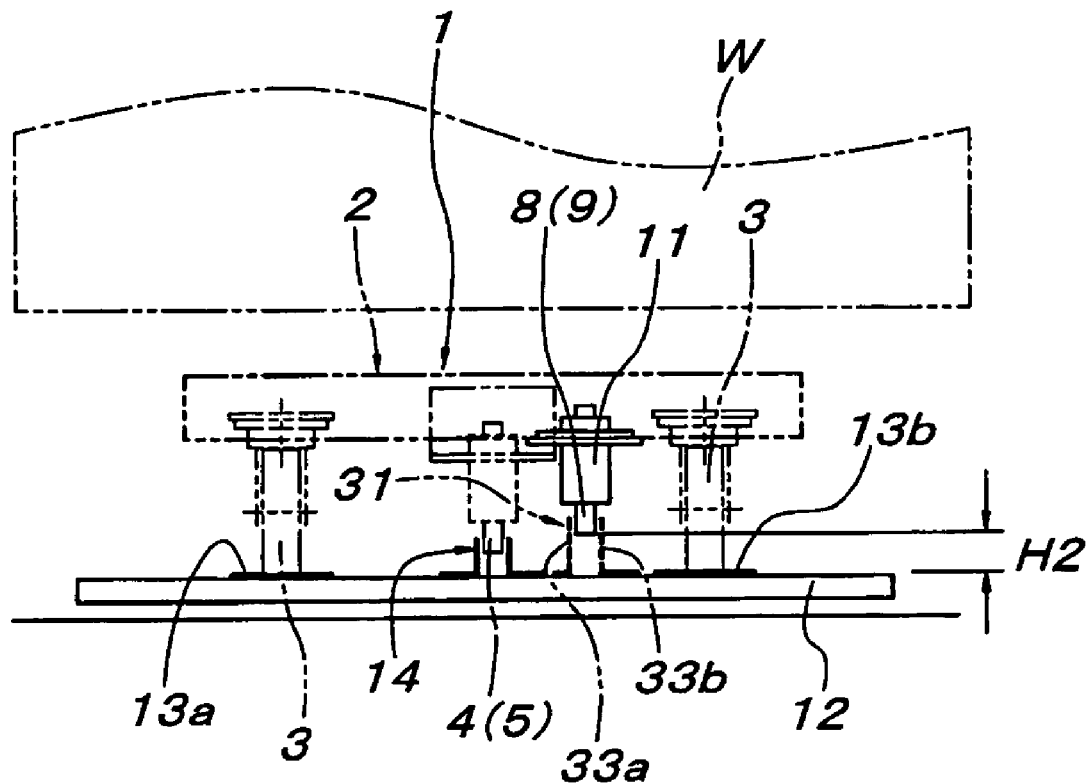
FIG. 5 is a front view of the carriage at a rear auxiliary guided member of the carriage.

As shown in FIG. 3, the bottoms of the main guided members 4 and 5 are positioned at a height H1 above the belt plates 13a and 13b. As shown in FIG. 4, the bottoms of the front auxiliary guided members 6 and 7 are positioned at a height H3 above the belt plates 13a and 13b. The height H3 is greater than the height H1. As shown in FIG. 5, the bottoms of the rear auxiliary guided members 8 and 9 are positioned at a height H2 above the belt plates 13a and 13b. The height H2 is higher than the height H1 and lower than the height H3.

A main guide rail 14 lies between and in parallel with the belt plates 13a and 13b and is supported by the cross frames 12. The main guide rail 14 consists of a right vertical plate 15a and a left vertical plate 15b, which are spaced from each other so that the bottoms of the main guided members 4 and 5 can engage loosely with them.

Figure 6:
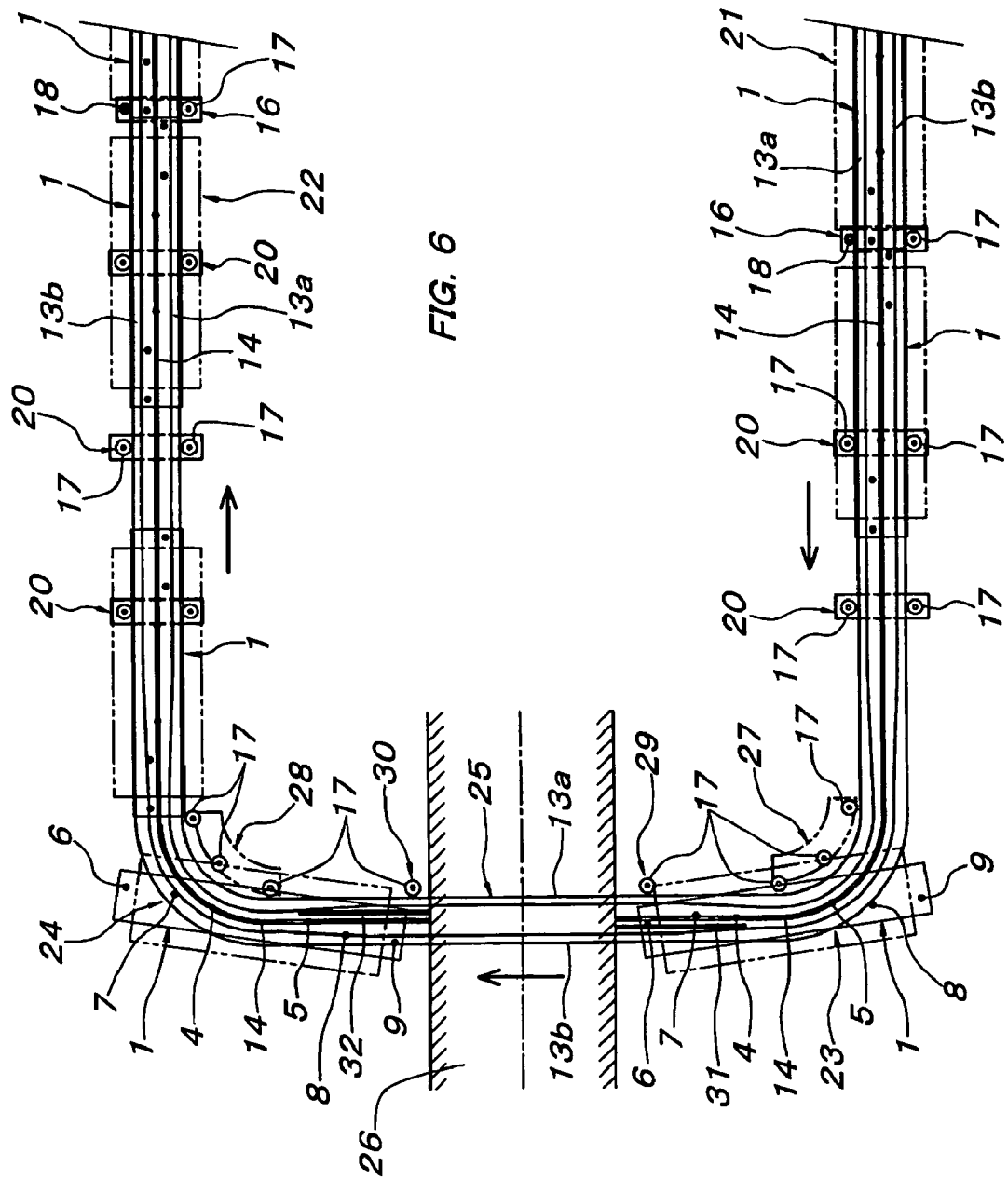
FIG. 6 is a partial top plan of the track of the conveyor.

FIG. 6 shows part of the closed-loop track, which includes linear paths 21, 22 and 25 and right-angle turning paths 23 and 24. The turning path 23 connects the front end of the linear path 21 and the rear end of the linear path 25. The turning path 24 connects the front end of the linear path 25 and the rear end of the linear path 22. The linear path 25 crosses a passage 26. The linear path 25 is so short that the front end of the carriage 1 enters the passage 26 soon after moving from the upstream turning path 23 into this linear path 25, and that the front end of the carriage 1 enters the downstream turning path 24 soon after leaving the passage 26. The main guide rail 14 does not lie across the passage 26, but only the band plates 13a and 13b lie across it.

With reference to FIGS. 1, 3 and 6, friction drivers 16 and 20 are fitted along the linear paths 21 and 22. Each of the friction drivers 16 includes a friction drive roller 17 and a backup roller 18, each of which is supported rotatably on a vertical axis. The friction drive roller 17 can be rotated by a motor 19 and is biased into compressive contact with one of the frictional surfaces 10a and 10b of the carriage 1 by a biasing means (not shown). The backup roller 18 can be in contact with the other frictional surface 10a or 10b. Each of the friction drivers 20 includes a pair of friction drive rollers 17, which can be in compressive contact with the frictional surfaces 10a and 10b. The friction drive rollers 17 of the friction drivers 16 and 20 are substantially identical.

As shown in FIG. 6, other friction drivers 27 and 28 are fitted inside the turning paths 23 and 24, respectively. Each of the friction drivers 27 and 28 includes three friction drive rollers 17, but might include two, four or more friction drive rollers 17, which are spaced along the associated path. The friction drive rollers 17 of the friction drivers 16, 27 and 28 are substantially identical.

As shown in FIG. 6, still other friction drivers 29 and 30 are fitted on one side of the linear path 25, just upstream and downstream, respectively, of the passage 26. Each of the drivers 29 and 30 includes a friction drive roller 17. The friction drive rollers 17 of the friction drivers 16, 29 and 30 are substantially identical.

Figure 7:
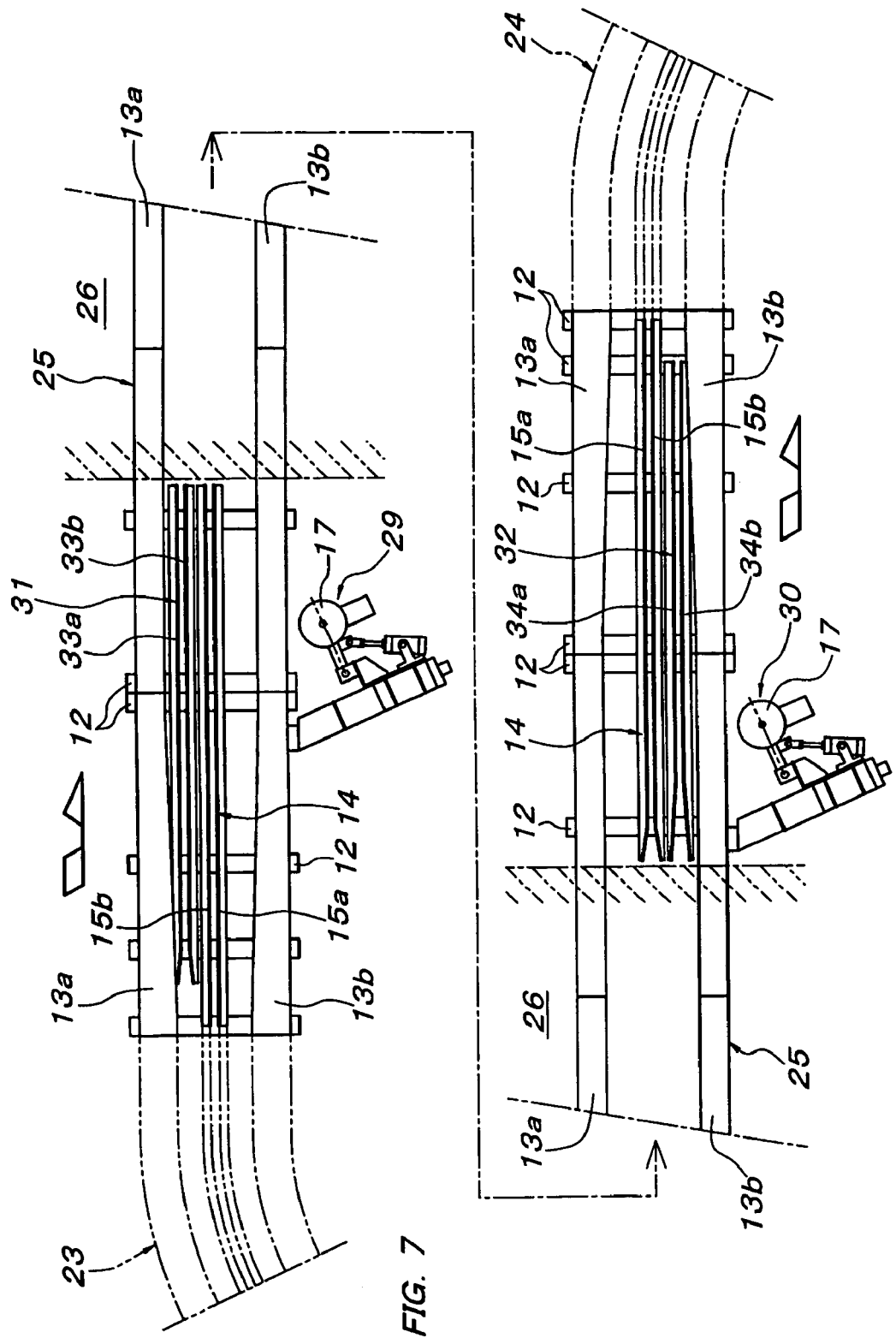
FIG. 7 is a partial top plan of the track, showing the main and auxiliary guide rails on both sides of a passage.

As shown in detail in FIG. 7, a rear auxiliary guide rail 31 and a front auxiliary guide rail 32 lie along the linear path 25. The rear auxiliary guide rail 31 lies between a point near the rear end of the linear path 25 and the passage 26, and between the left band plate 13a and the main guide rail 14. The rear auxiliary guide rail 31 consists of a pair of vertical plates 33a and 33b, which are spaced from each other so that the bottoms of the rear auxiliary guided members 8 and 9 of the carriage 1 can engage loosely with them. The front auxiliary guide rail 32 lies between the passage 26 and a point near the front end of the linear path 25, and between the right band plate 13b and the main guide rail 14. The front auxiliary guide rail 32 consists of a pair of vertical plates 34a and 34b, which are spaced from each other so that the bottoms of the front auxiliary guided members 6 and 7 of the carriage 1 can engage loosely with them.

The main and auxiliary guide rails 14, 31 and 32 differ in height according to the heights H1–H3 of the guided members 4–9 so that the guided members can engage with the guide rails at a roughly equal depth, as shown with two-dot chain lines in FIGS. 4 and 5.

Thus, the carriage 1 is supported by its casters 3 on the band plates 13a and 13b and can run in a position parallel with the main guide rail 14 along the horizontal track, with its main guided members 4 and 5 engaging with this rail. The carriage 1 can be driven forward with the motor-driven friction drive rollers 17 in compressive contact with one or both of its frictional surfaces 10a and 10b. The carriage 1 runs from the linear path 21 through the turning path 23, linear path 25 and turning path 24 to the linear path 22, as described below in detail.

With reference to FIG. 8, after the carriage 1 moves into the turning path 23, which is upstream of the passage 26, the friction driver 27 drives the carriage along this turning path into the linear path 25, with the main guided members 4 and 5 guided by the main guide rail 14. When the carriage 1 moves from the linear path 21 into the turning path 23, the front auxiliary guided members 6 and 7 shift from the right of the main guide rail 14 to the left, without colliding with this rail, which is lower than these members. Subsequently, when the carriage 1 moves from the turning path 23 into the linear path 25, the front auxiliary guided members 6 and 7 shift from the left of the rear auxiliary guide rail 31 and main guide rail 14 to the right, without colliding with these rails, which are lower than these members 6 and 7.

With reference to FIG. 9, after the carriage 1 moves from the turning path 23 into the linear path 25, the friction driver 29 drives the carriage linearly with the main guided members 4 and 5 guided by the main guide rail 14.

With reference to FIG. 10, when the front main guided member 4 of the carriage 1 disengages from the main guide rail 14 and enters the passage 26, the rear auxiliary guided member 8 of the carriage is in engagement with the rear auxiliary guide rail 31. The engagement of the rear main guided member 5 and rear auxiliary guided member 8 with the guide rails 14 and 31, respectively, enables the carriage 1 to move in a linear position into the passage 26. In other words, the length of the rear auxiliary guide rail 31 is equal to or slightly longer than the distance between the front main guided member 4 and rear auxiliary guided member 8 in the running direction.

Figure 11:
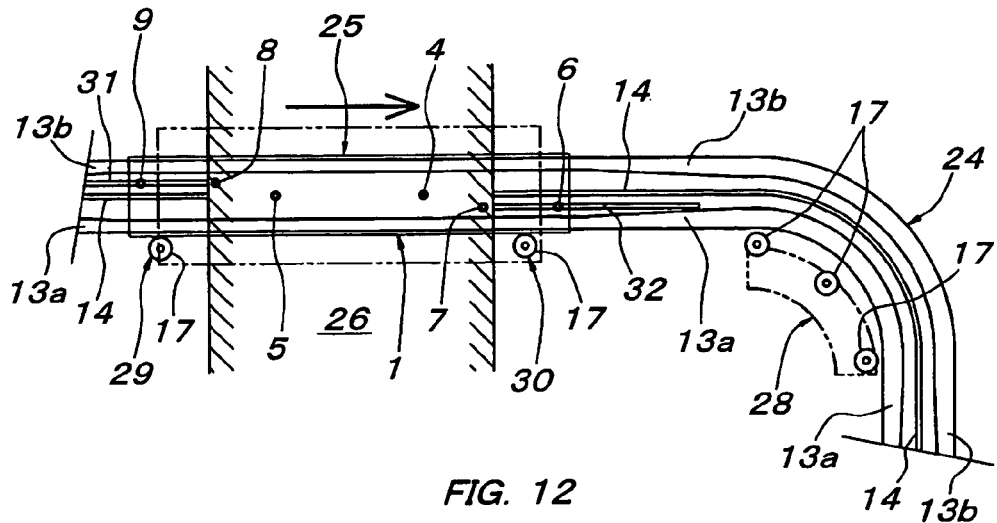
FIGS. 11–13 are partial top plans of the closed-loop track, showing how the carriage runs across the passage.

With reference to FIG. 11, when the rear auxiliary guided member 8 disengages from the rear auxiliary guide rail 31 and enters the passage 26, with only the rear auxiliary guided member 9 engaging with this rail, the front auxiliary guided member 6 is already in engagement with the front auxiliary guide rail 32, which is downstream of the passage 26. Then, the carriage 1 is driven forward by the friction driver 30, which is downstream of the passage 26, with the auxiliary guided members 6 and 9 guided by the auxiliary guide rails 32 and 31, respectively.

Figure 12:
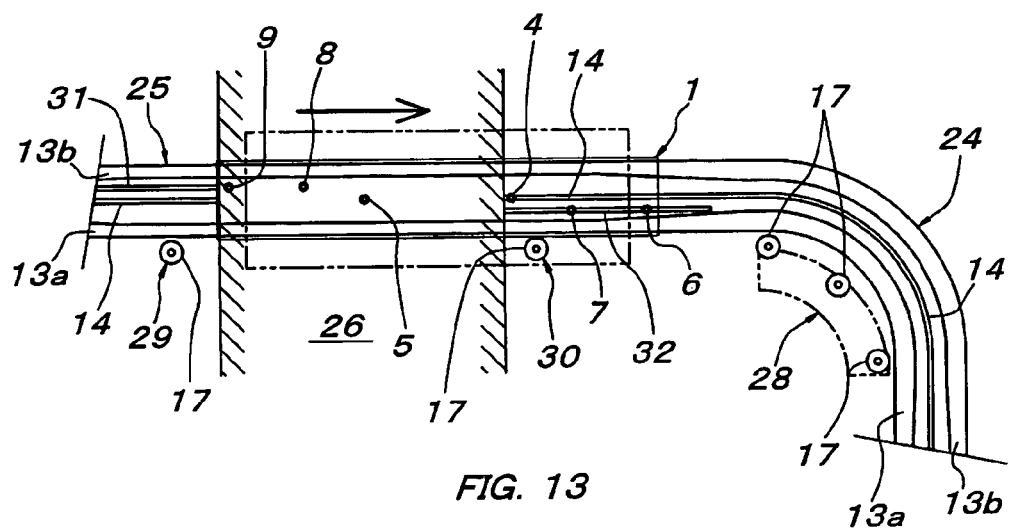

With reference to FIG. 12, when the rear auxiliary guided member 9 disengages from the rear auxiliary guide rail 31 and enters the passage 26, both of the front auxiliary guided members 6 and 7 are in engagement with the front auxiliary guide rail 32. Thus, the carriage 1 is driven linearly across the passage 26 by the friction driver 30, with these guided members 6 and 7 guided by this rail 32. In other words, the width of the passage 26, which equals the distance between the auxiliary guide rails 31 and 32 in the running direction, is equal to or slightly narrower than the distance between the front and rear auxiliary guided members 6 and 8, or between the front and rear auxiliary guided members 7 and 9, in the running direction.

Figure 13:
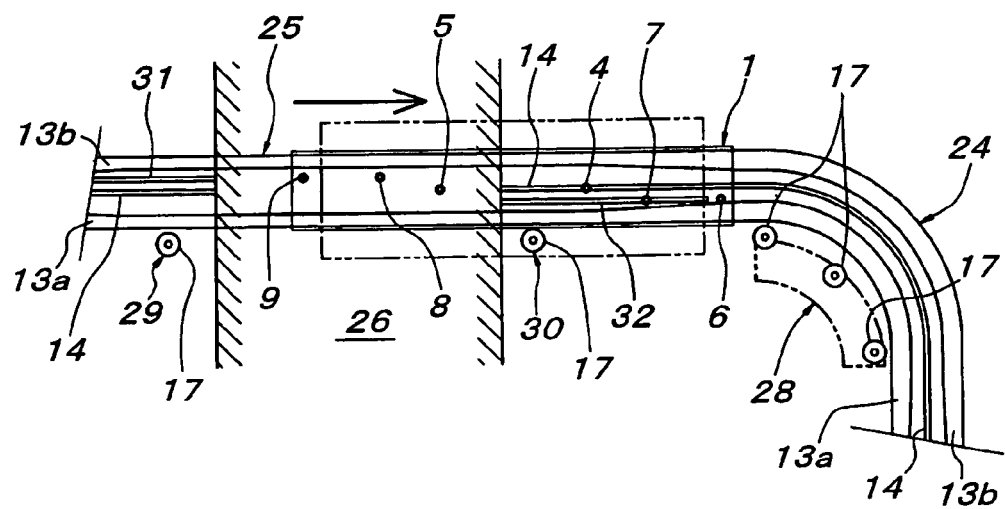

With reference to FIG. 13, when the front auxiliary guided member 6 disengages from the front auxiliary guide rail 32, the front main guided member 4 is already in engagement with the main guide rail 14, so that the carriage 1 can run linearly toward the turning path 24, with the other front auxiliary guided member 7 and the front main guided member 4 guided by these rail 32 and 14, respectively.

Figure 14:
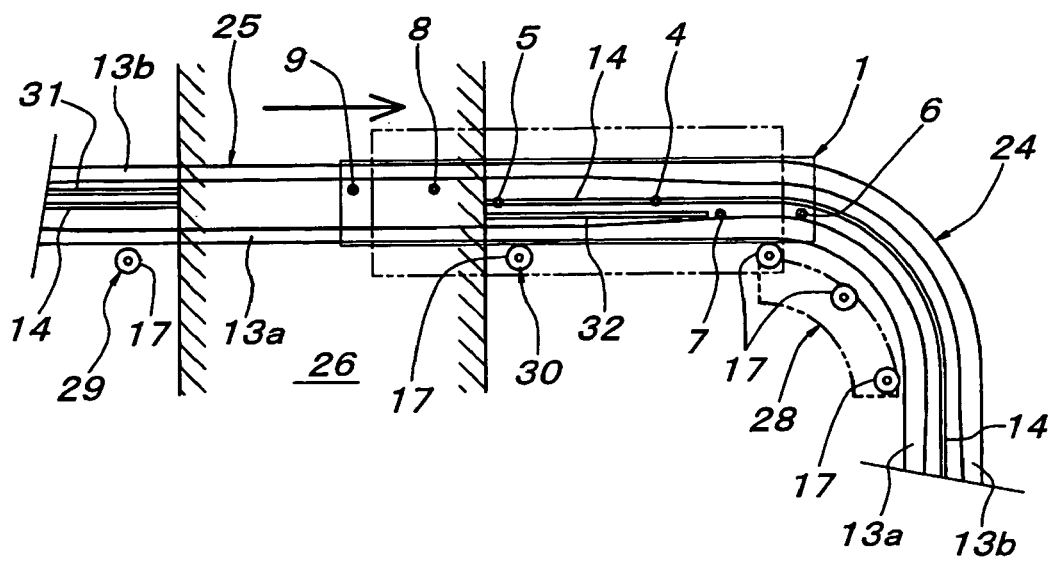
FIGS. 14 and 15 are partial top plans of the track, showing how the carriage runs on the downstream side of the passage.

With reference to FIG. 14, when both of the front auxiliary guided members 6 and 7 disengage forward from the front auxiliary guide rail 32, both of the main guided members 4 and 5 are already in engagement with the main guide rail 14. Thereafter, the friction driver 30 drives the carriage 1 toward the turning path 24, with the main guided members 4 and 5 guided by the main guide rail 14. In other words, the length of the front auxiliary guide rail 32 is equal to or longer than the distance between the front auxiliary guided member 7 and rear main guided member 5 in the running direction.

Figure 15:
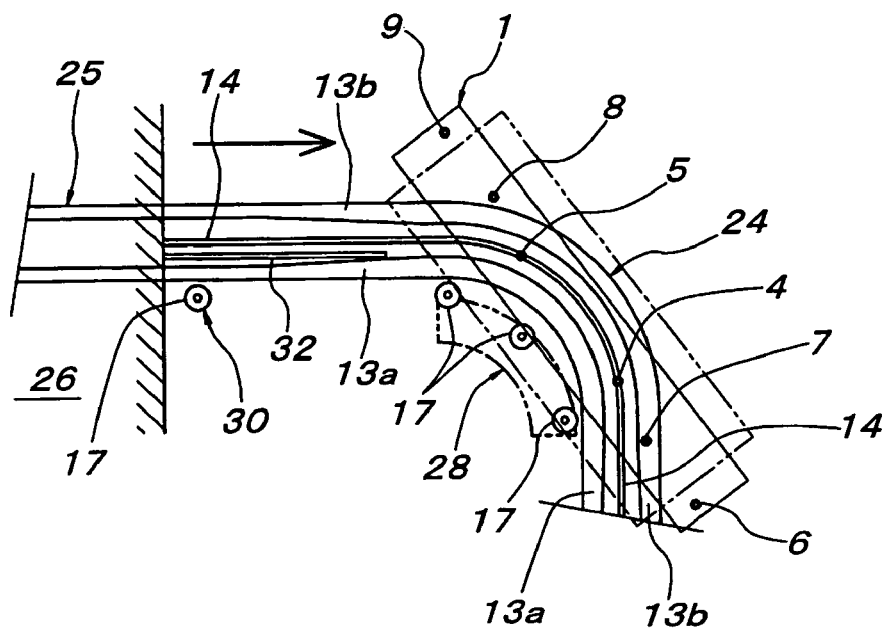

With reference to FIG. 15, when the carriage 1 moves from the linear path 25 into the turning path 24, the friction driver 28 then drives the carriage along this turning path toward the linear return path 22 (FIG. 6). When the carriage 1 moves from the linear path 25 into the turning path 24, the front auxiliary guided members 6 and 7 shift from the right of the main guide rail 14 to the left, without colliding with this rail, which is lower than these members. Subsequently, when the carriage 1 moves from the turning path 24 into the linear path 22, the front auxiliary guided members 6 and 7 return to the right of the main guide rail 14, without colliding with this rail.

Basically, the main and auxiliary guided members 4–9 might have a structure other than is shown in the drawings.

For example, the guided members might be pairs of vertical-axis rollers for engaging with both sides of guide rails, or be vertical-axis rollers for engaging with the grooves of grooved guide rails.

Basically, the main and auxiliary guided members 4–9 might be positioned laterally of the carriage 1 otherwise than are shown in the drawings. Specifically, the front auxiliary guided members 6 and 7 might be positioned on the left side of the main guide rail 14, and the rear auxiliary guided members 8 and 9 might be positioned on the other side. In this case, the front auxiliary guide rail 32 would be positioned on the left side of the main guide rail 14, and the rear auxiliary guide rail 31 would be positioned on the other side. In this case, the front auxiliary guided members 6 and 7 would not traverse the rear auxiliary guide rail 31, which lies between the turning path 23 and the passage 26, but the rear auxiliary guided members 8 and 9 would traverse the front auxiliary guide rail 32, which lies between the passage 26 and the turning path 24. This would require the rear auxiliary guided members 8 and 9 to be higher than the front auxiliary guide rail 32 so that they might not collide with it.

What is claimed is:

1. A friction-drive carriage type conveyor comprising:
    a track, the track being traversed by a passage (26) of predetermined width to thereby have two track sections, one side track section bound for the passage the other side extending downstream from the passage;
    a carriage (1) having a length greater than the width of said passage and so supported as to run in a running direction along the track;
    the carriage (1) including casters (3) for rolling on the track and supporting the carriage;
    the carriage (1) having a frictional surface (10a) extending in the running direction;
    friction drivers (16) arranged on a side of the track for contacting with the frictional surface (10a) to drive the carriage (1) along the track;
    a main guide rail (14) lying on the whole length of both the track sections except for the passage (26) which has no main rail;
    a rear auxiliary guide rail (31) lying on the track section bound for the passage (26) and spaced laterally from said main guide rail (14); and
    a front auxiliary guide rail (32) lying on the track section extending downstream from the passage (26) and spaced laterally from said main guide rail (14);
    the carriage (1) further including a pair of main guided members (4, 5) mounted in fixed relation to the carriage and engageable with the main guide rail (14), the main guided members being positioned along a first axis of the carriage extending in the running direction and spaced from each other along said axis by a distance shorter than the width of the passage (26) such that both of said main guided members (4, 5) are disengaged from said main guide rail (14) during a period while said carriage is traversing said passage (26);
    the carriage (1) further including a pair of front auxiliary guided members (6, 7) mounted in fixed relation to the carriage, spaced laterally from said first axis and engageable with the front auxiliary guide rail (32), the front auxiliary guided members being spaced from each other in the running direction and being positioned in front of the main guided members (4, 5);
    the carriage (1) further including a pair of rear auxiliary guided members (8, 9) mounted in fixed relation to the carriage, spaced laterally from said first axis and engageable with the rear auxiliary guide rail (31), the rear auxiliary guided members being spaced from each other in the running direction and being positioned in back of the main guided members (4, 5);
    a distance between a forwardmost front auxiliary guided member and a rearwardmost rear auxiliary guided member being greater than the width of said passage (26);
    wherein, while the carriage (1) is caused to move over the passage (26), at least two of the guided members (4–9) at all times engage with the associated guide rails (14, 31, 32).

2. A friction-drive carriage type conveyor according to claim 1, wherein the track includes at least one turning path (23, 24), and wherein at least one pair of either of the pair of front auxiliary guided members (6, 7) and the pair of rear auxiliary guided members (8, 9) is positioned on one lateral side of the carriage, relative to the main guide rail (14), offset toward an inside of a curve of the turning path (23, 24) and on a level higher than the main guide rail.

3. A friction-drive carriage type conveyor according to claim 2, wherein the turning path (23, 24) of the track is located near to the passage (26), the pair of front auxiliary guided members (6, 7) being arranged to differ in a level of height from the pair of rear auxiliary guided members (8, 9), wherein one pair of auxiliary guided members arranged on a relatively higher level is positioned higher than the auxiliary guide rail engageable with the other pair of auxiliary guided members arranged on relatively lower level.

4. A friction-drive carriage type conveyor according to claim 1, wherein each of the main and auxiliary guide rails (14, 31, 32) consists of a pair of vertical plates (15a, 15b; 33a, 33b; 34a, 34b), and each of the main and auxiliary guided members (4–9) is a vertical pin supported rotatably around a vertical axis on the carriage and engageable with inner sides of the vertical plates.

* * * * *